March 1, 1949.　　　　H. F. CLAUSEN　　　　2,463,019
BEET LOADER
Filed June 19, 1944
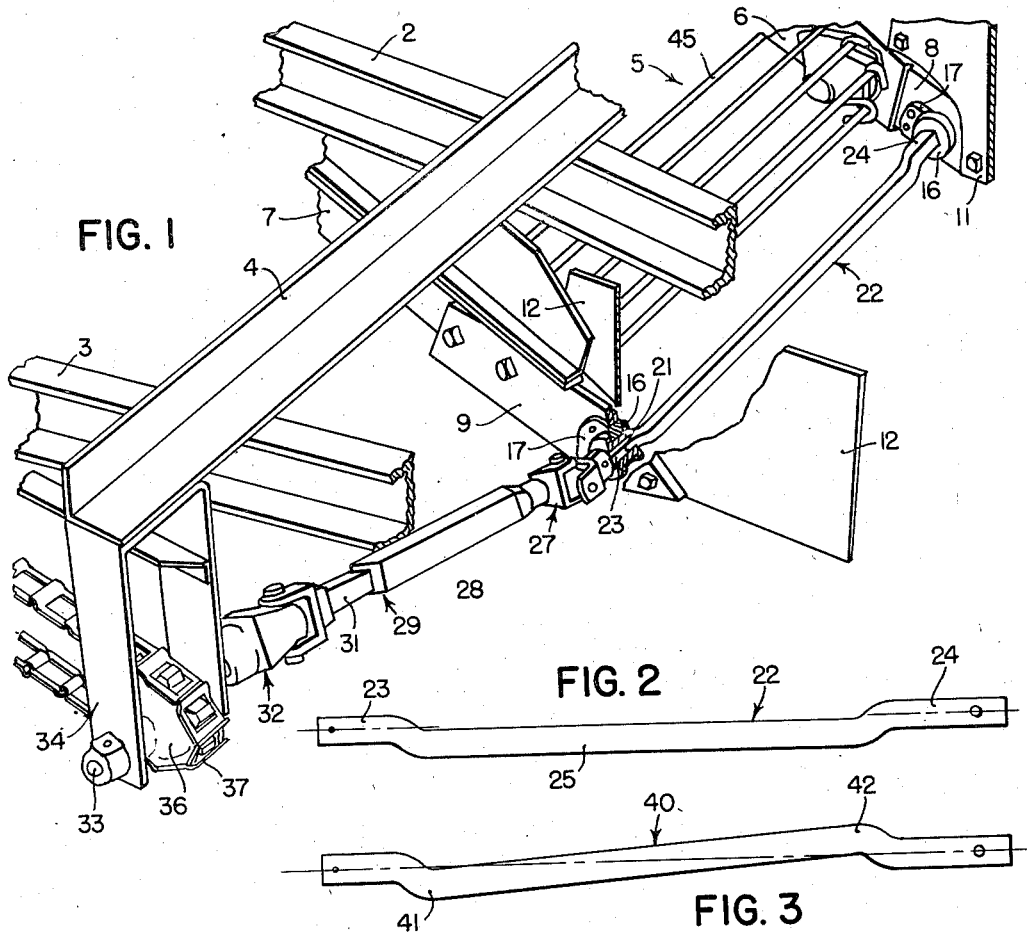
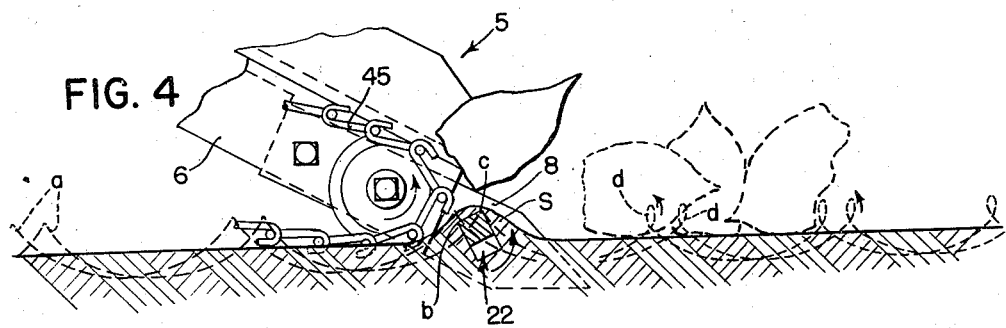
INVENTOR.
HOWARD F. CLAUSEN
BY
ATTORNEYS Patented Mar. 1, 1949

2,463,019

UNITED STATES PATENT OFFICE 2,463,019

BEET LOADER

Howard F. Clausen, Moline, Ill., assignor to Deere & Company, Moline, Ill., a corporation of Illinois Application June 19, 1944, Serial No. 540,920

5 Claims. (Cl. 55—17)

The present invention relates generally to agricultural machines and more particularly to loaders for removing root crops and the like, especially those that have been piled or windrowed, from the ground and elevating them into a wagon or truck driven alongside the loader.

The object and general nature of the present invention is the provision of certain new and useful improvements in loaders wherein a rotatable rod is employed and caused to move at or just under the ground surface for picking up the crop from the ground and directing it into an elevator. More particularly, it is a feature of this invention to provide a new and improved loader for sugar beets that have been piled or windrowed. A more specific feature of the present invention is the provision of a particular kind of rotary rod, namely, one that is provided with one or more offset portions so that as the rod is driven the rod forcibly directs the beets on the ground upwardly so as to facilitate their entrance into the beet elevator as the loader travels along the piles of beets. Preferably, the rod is polygonal in section, as, for example, square, and each offset is approximately one-half the thickness of the rod so that when operated at or just under the ground surface the rod carries with it a cushion of loosened earth that is interposed between the rod and the beets on the ground, thus protecting the beets against being bruised, since there is no direct contact between the rod and the beets, and at the same time the offset portion or portions of the rod act rhythmically to project the beets upwardly to an extent sufficient to insure their entrance into the elevator, as the loader moves forward long the windrow.

These and other objects and advantages of the present invention will be apparent to those skilled in the art after a consideration of the following detailed description, taken in conjunction with the accompanying drawings.

In the drawings:

Figure 1 is a fragmentary perspective view of the front end of a beet loader, showing in particular the rotary offset rod.

Figure 2 is an enlarged fragmentary view showing one form of offset rod in which the offset portion between the ends of the rod lies at one side of the axis of rotation.

Figure 3 shows a modified form of rod in which the offset section is divided into two parts, one being offset at one side of the axis of rotation and the other being offset at the other side thereof.

Figure 4 shows the action of the loader in operation.

Referring now to the drawings, the beet loader in which the principles of the present invention have been incorporated is substantially the same as that shown in the co-pending application, Serial No. 456,459, filed August 26, 1942 by Claude W. Walz et al., for Beet loader, now Patent No. 2,432,956 issued December 16, 1947, and hence has been only fragmentarily illustrated. Briefly, the beet loader includes a generally horizontal forwardly extending frame made up of two main bars 2 and 3 and a cross bar 4 at the front, the frame supporting a vertically adjustable beet elevator unit, indicated in its entirety by the reference numeral 5. The elevator unit 5 is supported in any suitable manner at its rear end for generally vertical swinging, and at its forward end the two laterally spaced elevator frame members 6 and 7 carry rod weeder shoes 8 and 9, forward of which a pair of guide shields 11 and 12 are secured, as by bolts 13. The rod weeder shoes 8 and 9 are per se of conventional construction, being apertured to detachably receive spool-like cylindrical bearing members 16 and bearing shoes 17.

Each of the spool-like members 16 is provided with a square opening 21 therein to receive a rotatable rod member indicated in its entirety by the reference numeral 22. As best shown in Figure 2 the rod member 22 is provided with ends 23 and 24 that are offset, with respect to the central portion of the rod, in the same direction. Viewed in another way, the central section, indicated by the reference numeral 25, is offset at one side of the axis of rotation as defined by the ends 23 and 24 which are carried in the rotatable bearing members 16. One of the ends of the rod 22 extends through the associated bearing and receives a universal joint 27 to which one section 28 of a telescopic shaft unit 29 is connected. The shaft section 28 is preferably in the form of a square tube and receives a square rod 31 forming the other section of the telescopic shaft unit 29. The universal joint 32 is connected to a shaft section 31 and to a rotatable shaft 33 supported in a bracket 34 carried by one end of the cross bar 4. The shaft 33 carries a sprocket 36 which is driven by a chain 37 from any suitable source of power, such as a gear box mounted on the beet loader and driven from the take-off shaft of the tractor that propels the outfit. The telescopic shaft section 29 extends upwardly and outwardly at an angle with respect to the vertical and attention is directed to the fact that it is the sleeve section 28 of the unit 29 that extends from the lower universal joint 27 upwardly. Remembering that the rod 22 operates at or just under the ground surface, the upwardly and outwardly extending sleeve section 28 extends far enough to prevent soil and the like from adhering to the square shaft section 31 and interfering with its in and out movement with respect to the tubular section 28 when the front end of the elevator is raised and lowered.

Another form of rod is indicated in Figure 3. This rod is substantially the same as the rod 22 described above except that the rod, which is indicated in its entirety by the reference numeral 40, is provided with an offset 41 at one side of the axis of rotation at one end of the rod while at the other end of the rod the offset section 42 extends in the other direction relative to the axis of rotation. As shown in dotted lines in Figure 3, there is zero offset in the center of the rod. The rod 40 is mounted in bearings in the same way as the rod 22 is mounted.

The operation of both forms of offset rods is illustrated in Figure 4. When picking up beets and the like from piles or windrows, the front end of the beet elevator unit 5 is lowered until the rod passes along the ground surface, just at the ground surface or preferably slightly below. The rotation of the rod, particularly the rotation of the offset portions thereof, causes the soil to become loosened under the beets and to be drawn around over the rod and toward the elevator chain 45. The thickness of this cushion of soil that intervenes between the beets and the rod, preventing actual contact between them, may be varied by raising or lowering the front end of the elevator, and preferably the rod is not forced into the ground any farther than is necessary to provide the desired cushion of soil. Due to the rapid rotation of the offset portions a series of rhythmic or periodic blows or impact loads are imparted generally upwardly and rearwardly through the intervening soil cushion against the beets. For example, the curves $a$ represent the paths of movement through the soil of the outermost corners $b$ and $c$ of the rod 22. Where the rate of rotation of the rod 22 is such that the peripheral velocity of the corners $b$ and $c$ is slightly less than the rate of forward travel of the outfit, the paths of movement of the corners $b$ and $c$ are about as indicated at $a$ in Figure 4. It will be understood, of course, that the rod 22 carries with it a cushion of soil S as the machine travels over the ground, somewhat in the form of a wave and that at the crests of the paths $a$ the rod is actually prevented from coming into direct contact with the beets by a cushion of soil S in much the same manner as is illustrated in the central portion of Figure 4. Thus, the rotation of the offset rod 22 produces a series of generally upwardly directed blows, relatively slight in amplitude and cushioned by the cushion of soil S, although, if desired, the front end of the elevator 5 may be raised to such a point that the cushion of soil S is quite thin or actually non-existent if direct contact between the rod and the beets is not objectionable. If the rod 22 is rotated at a slightly increased rate so that the peripheral velocity of the corners $b$ and $c$ is somewhat greater than the rate of forward travel of the machine, then the curves $b$ represent generally the paths of movement of the corners $b$ and $c$ through the ground. Again it will be seen that the offset rod provides a series of generally upwardly directed blows which elevate the beets slightly as the machine travels forwardly, it generally being preferred that these blows be softened by a cushion of soil S between the rod and the beets. Where the rod 22 is rotated at the faster rate, the paths $d$ actually form loops and for a portion of the movement the path of each corner $b$ or $c$ of the rod is actually rearwardly. This, of course, facilitates the entrance of the beets into the zone of action of the chain 45 as the machine advances forwardly along the piles or windrow of beets. In the form of rod shown in Figure 3, there is a maximum of agitation at the sides with a minimum of agitation in the center. This has the advantage of working the beets toward the center of the elevator, thus cooperating with the guides 11 and 12 in causing all of the crop to be gathered into the loader.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In a loader for beets and the like, a mobile support having portions adapted to pass along close to the ground surface, a pair of laterally spaced apart rod-receiving bearings, a rotary rod mounted in said bearings for rotation about an axis, a portion of said rod between its ends being offset with respect to said axis, means for mounting said bearings on the lower portions of said support in such position thereon that, when the rod is rotated, said offset portion on its lower swing contacts and passes just underneath the ground surface, and means for rotating said rod.

2. In a loader for beets and the like, the invention as defined in claim 1, further characterized by said rotary rod having its end portions offset in opposite directions with respect to the central section thereof, said offset portions lying substantially in the same plane and journaled for rotation in said bearings.

3. A beet loader comprising a mobile support, a transverse rotary rod mounted for rotation on said support adjacent the ground surface and formed with one or more beet-engaging portions that are offset with respect to the axis of rotation of said rod, means mounting said rotary rod on said mobile support so as to dispose said rod normally in a position so that when rotated said offset portion or portions of said rod engage and pass under the ground surface, means for rotating said rod in a direction so that the offset portion or portions carry soil and the like over the top thereof and rearwardly so as to provide a cushion of soil between said offset portion or portions and the beets to be loaded, and upwardly moving conveyor means having its lower end sufficiently close to said rod so as to prevent beets and the like from falling down between said rod and conveyor means.

4. In a loader for beets or other crop lying on the ground, a mobile support having a pair of laterally spaced apart rod-receiving bearings disposed in operation adjacent the ground, a part having its ends journaled for rotation in said bearings and at least one portion between its ends offset with respect to the axis of rotation defined by said journaled ends, said offset portion being polygonal in cross section, and means for rotating said part in a direction so that said offset portion, as it passes through the lower portion of its path of rotation, moves in substantially the same direction as the direction of movement as said mobile support and, as it passes through the upper portion of its path of rotation, said offset portion moves in a direction substantially opposite to the direction of movement of said mobile support, whereby the corners of said offset portion impart a series of generally upwardly directed blows against said crop.

5. Apparatus for loading beets and other crops on the ground into a vehicle or other receiver, comprising a mobile support, means carried thereby and adapted to pass along the ground surface, a movable driven crop impelling member comprising a rotatable rod, said rod having an offset portion between the ends of said rod, said offset portion being polygonal in cross section, means for rotatably carrying said rod on the lower portion of said support means in a position thereon so that said offset portion passes at least partially under the surface of the ground, on which the beets or other crop lie, at least during the lower swing of said offset portion, means driving said member, and conveyor means positioned adjacent said member so as to receive the crop after it has been elevated by blows imparted thereto by said offset portion, said crop receiving means serving to move the crop to said crop receiver.

HOWARD F. CLAUSEN.

REFERENCES CITED

The following references are of record in the file of this patent:

UNITED STATES PATENTS

| Number | Name | Date |
| --- | --- | --- |
| 647,451 | Maulhardt | Apr. 10, 1900 |
| 880,861 | Champagne | Mar. 3, 1908 |
| 946,273 | Richards | Jan. 11, 1910 |
| 1,049,340 | Casey | Jan. 7, 1913 |

FOREIGN PATENTS

| Number | Country | Date |
| --- | --- | --- |
| 780,794 | France | Feb. 11, 1935 |